United States Patent [19]
Bisey

[11] Patent Number: 5,367,614
[45] Date of Patent: Nov. 22, 1994

[54] THREE-DIMENSIONAL COMPUTER IMAGE VARIABLE PERSPECTIVE DISPLAY SYSTEM

[75] Inventor: Robert P. Bisey, Seaford, N.Y.

[73] Assignee: Grumman Aerospace Corporation, Bethpage, N.Y.

[21] Appl. No.: 861,479

[22] Filed: Apr. 1, 1992

[51] Int. Cl.[5] .......................................... G06F 15/62
[52] U.S. Cl. ..................................... 395/119; 395/155
[58] Field of Search ............... 359/479; 395/119, 155, 395/162; 367/140, 129; 434/44; 364/578

[56] References Cited
U.S. PATENT DOCUMENTS

| | | |
|---|---|---|
| 3,777,305 | 12/1973 | Stoutmeyer . |
| 3,821,469 | 6/1974 | Whetstone et al. . |
| 3,836,953 | 9/1974 | Rotier . |
| 4,051,350 | 9/1977 | Parent . |
| 4,665,282 | 5/1987 | Sato et al. . |
| 4,682,159 | 7/1987 | Davison . |
| 4,807,202 | 2/1989 | Cherri et al. ........................ 367/129 |
| 5,148,310 | 9/1992 | Batchko et al. ..................... 359/479 |

Primary Examiner—Robert L. Richardson
Attorney, Agent, or Firm—Scully, Scott, Murphy & Presser

[57] ABSTRACT

A three-dimensional computer image variable perspective display system provides for the real-time perspective control of a three-dimensional computer generated image controlled by the head movements of a computer operator viewing the image. The system includes an ultrasonic transmitter module worn on the head of the computer operator, a set of ultrasonic receivers mounted on or near the computer display monitor, and a computer interface unit. The ultrasonic transmitter transmits sound waves towards the display monitor which are detected by the ultrasonic receivers and processed by the computer interface unit. The computer interface unit calculates the elapsed times between the transmission and reception of the sound waves and converts this information into digital data words. The quantative magnitude of these data words represent in direct proportion, the instantaneous distance between the ultrasonic transmitter and the ultrasonic receivers. This distance information interacts with rotational axis algorithms used to control the three-dimensional display to cause the image to change it's perspective view in correspondence to the movement of the computer operator's head, in a manner exactly analogous to viewing three-dimensional objects in nature.

30 Claims, 7 Drawing Sheets

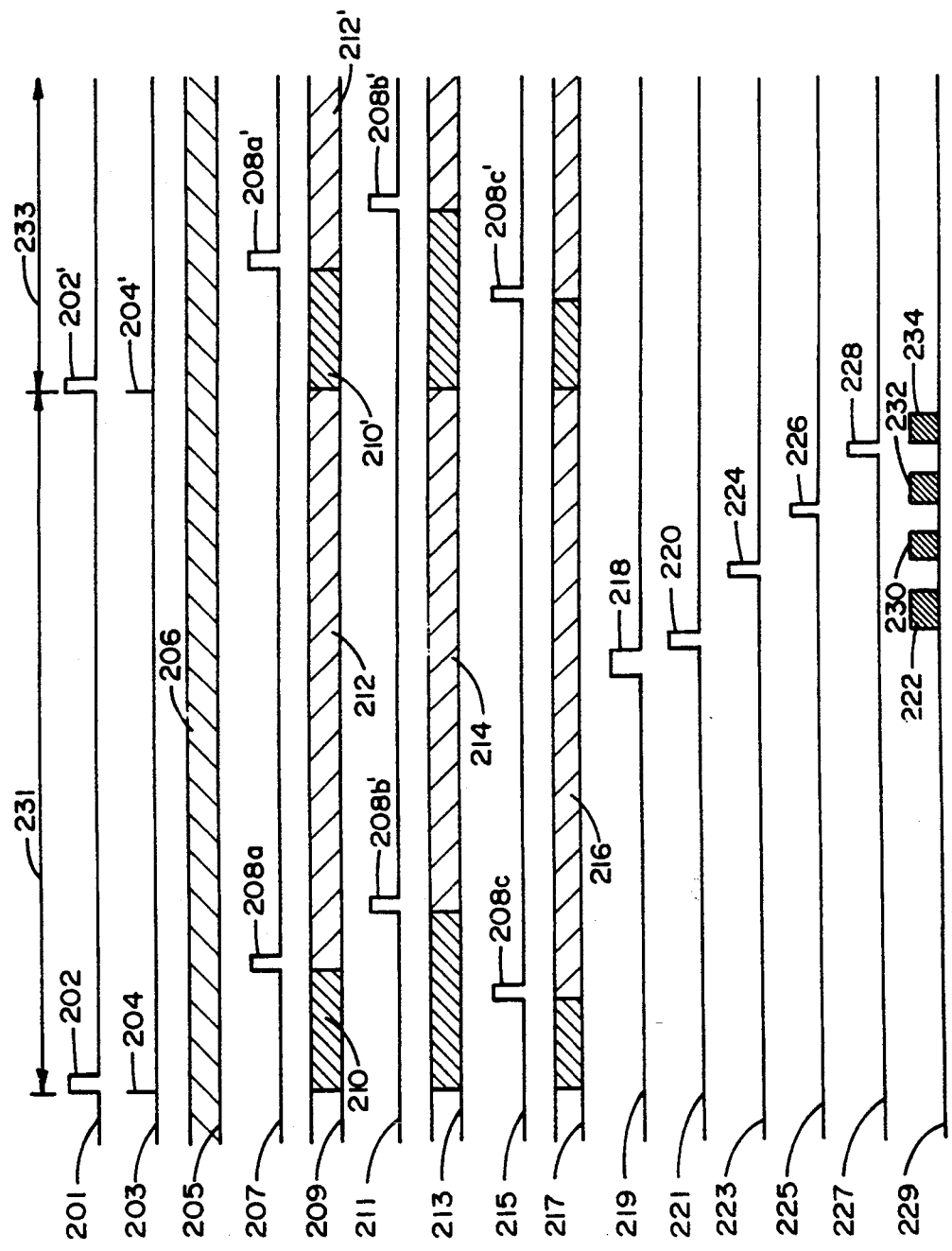

THREE-DIMENSIONAL COMPUTER IMAGE VARIABLE PERSPECTIVE DISPLAY SYSTEM

BACKGROUND OF THE INVENTION

1. Field of the Invention

The present invention relates to an arrangement for controlling the perspective view of a three-dimensional graphical display, and more particularly, pertains to a display system and method which provides for the real-time perspective control of three-dimensional computer images, directly controlled by the head movements of a computer operator viewing the images on a computer monitor.

2. Discussion of the Prior Art

Three-dimensional, computer generated images are now commonplace in the scientific, commercial, and entertainment fields. Scientists and mathematicians use three-dimensional wire frame models for example, to image and plot mathematical functions in three-dimensional space in order to obtain "spatial/visual" representations of complex mathematical relationships. Engineers use three-dimensional imaging techniques to create models to study before actually having a prototype constructed. With the use of three-dimensional imaging techniques, engineers are able to view various aspects of the design they would not have been able to do without actually constructing a model. Numerous CAD/CAM utilities exist for creating these three-dimensional images for engineering and scientific work at a relatively low cost. The commercial and entertainment fields also make extensive use of three-dimensional images in television commercials, station logos, and the like.

An important feature of the programs utilized for generating three-dimensional images is the ability to alter the position of the displayed image. This feature allows the system user to view for example, the underside of a particular object which is not shown in the original view. Such three-dimensional images are usually rotated about any one or a combination of the traditional X, Y, or Z orthogonal axes using preprogrammed computer algorithms which deliberately provide for a specified rotation of the three-dimensional image about a specified axis (or axes) for a specified period of time. These three-dimensional images can also be manually manipulated in real time through the use of such computer interactive devices as a joystick or a mouse.

All the above mentioned methods do not, however, allow for the spontaneous, real-time interaction of the instantaneous positional relationship of human eyesight with the movements of the computer generated three-dimensional image. The present invention permits the direct control of the perspective view of computer generated three-dimensional images, in direct proportion to the head movements of the observer viewing the three-dimensional image on a computer monitor, in a manner identical to the same changing visual perspective of objects a person would normally experience in nature.

SUMMARY OF THE INVENTION

The present invention is directed to an arrangement comprising an apparatus and method for controlling the perspective view of a computer generated, three-dimensional graphic image in direct proportion to the head movements of a computer operator viewing the images on a computer monitor. The arrangement comprises three main functional units. A transmitting unit, which is mounted on or in close proximity to the computer operator's head, is utilized to transmit bursts of ultrasonic signals of a given frequency and at predetermined intervals towards the computer monitor. These signals are detected or received by a plurality of ultrasonic receivers, which are mounted in close proximity to the computer display monitor. In order to update or control the perspective view of the image, it is necessary to determine the positional relationship between the computer operator's head and the image on the computer display monitor. Based upon the elapsed time between the transmission of the bursts of ultrasonic signals from the transmitting unit and receipt of the ultrasonic signals by the ultrasonic receivers, the position of the computer operator's head in relation to the computer monitor is determined. A measuring circuit is utilized to determine the elapsed times. The measuring circuit receives signals generated by the ultrasonic receivers and through a plurality of binary counting devices, determines the elapsed time between transmission and receipt by establishing a binary count representative of elapsed time. A processing circuit converts the binary count into linear distances for all three axis in three-dimensional space. These linear distances then interact with the X, Y, and Z rotational axis algorithms of the graphics software resident in the host graphics computer to alter the perspective view of the graphical image.

The present invention provides for the real-time perspective control of a three-dimensional computer image, directly controlled by head movements of the observer of the image as displayed on a computer monitor. The present invention has applications in pattern recognition systems whose end purpose is to provide electronic recognition of militarily-significant targets. In this particular application, the added feature of controlling the perspective view of a military scene/target scenario by simple head movements provides an additional dimension of information regarding the depth perception of one or many objects, as well as visual indications as to the presence or absence of hidden objects which come into and out of view, in a manner which is analogous to the perception of these objects when viewed in nature. The present invention also has application as a true-to-life, perspective-enhanced computer image generator system for use in pilot training. Present flight simulators fail to provide pilot trainees with the actual look and feel of true flight. Through the use of the present invention, pilots will achieve a better sense of flying perspective if the objects and scenery they view is manipulated to constantly update the perspective of the object in correspondence to pilot position.

The present invention also has a variety of commercial applications. For example, the present invention has applications in the medical field, specifically, in the manner of interaction between a physician and various CAT scan and magnetic resonance imaging (MRI) diagnostic devices which produce a three-dimensional image of various parts of the human body. The use of this invention gives the physician the ability to control the three-dimensional image via head movements while freeing the use of both hands, which can then be used to interact with and control the patient and/or other medical devices during these procedures.

The present invention also has potential applications in video arcade games, wherein the added dimension of head movement can exercise real-time control of animated three-dimensional graphics used extensively in a wide variety of video game scenarios. Handicapped persons may also benefit from the use of this invention, paraplegics for example, can interact with a three-dimensional image of their home or business environment for purposes of activating various remote control devices required to maintain and/or control the conditions of their surroundings.

Aspects of this invention can also be applied to the field of Artificial Intelligence, AI, wherein three-dimensional visual cues and information can be used to interact with AI programming.

BRIEF DESCRIPTION OF THE DRAWINGS

FIG. 7 is a timing signal diagram for all inputs and outputs of the computer interface unit of the present invention.

DESCRIPTION OF THE PREFERRED EMBODIMENTS

The three-dimensional computer image variable perspective display system of the present invention provides for the real-time perspective control of a three-dimensional computer image, directly controlled by the head movements of an observer viewing the image which is displayed on a computer monitor display. The basic principle behind the invention is to adjust the perspective view of a three-dimensional graphic image based upon, and in one-to-one correspondence to the movement of the computer operator's head in a manner exactly analogous to viewing objects in nature.

Figure 1:
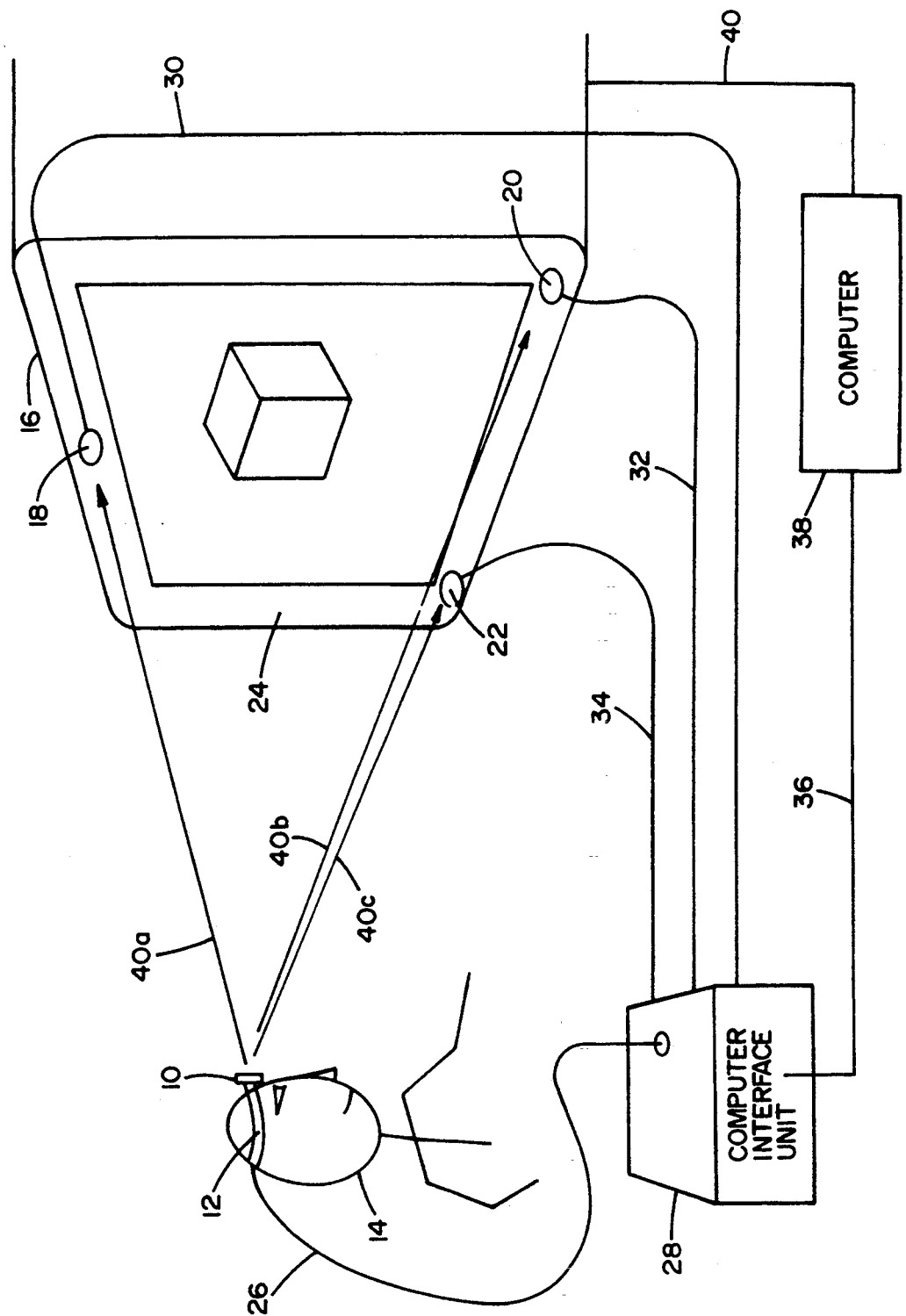
FIG. 1 is a schematic view of the three-dimensional computer image variable perspective display system of the present invention.

FIG. 1 illustrates a practical implementation of the three-dimensional computer image variable perspective display system of the present invention. A small, miniaturized audio frequency ultrasonic transmitter module 10 is mounted on a headband 12 which is worn on the head of a computer operator 14. The transmitter module 10 is positioned to direct the ultrasonic acoustic energy radiating therefrom directly towards the front face of the computer monitor display 16 which the computer operator 14 is viewing. Three audio frequency ultrasonic microphones 18, 20, and 22 are mounted with their sensitive axis facing towards the computer operator 14 at specific locations on the front bezel 24 of the computer display monitor 16. One ultrasonic microphone 18 is mounted in the middle of the top portion of the front bezel 24, while the remaining two ultrasonic microphones 20 and 22 are mounted on the lower right and left corners of the front bezel 24 respectively. These mounting positions are not critical as long as the three ultrasonic microphones 18, 20 and 22 are positioned far apart, in a more or less triangular configuration with respect to one another. For purposes of portability, the three ultrasonic microphones 18, 20 and 22 can be similarly affixed to the front surface of a prefabricated frame which can be positioned around the front bezel 24 of the computer monitor 16, with the three ultrasonic microphones 18, 20 and 22 facing towards the computer operator 14. The three ultrasonic microphones 18, 20 and 22 can also be attached to the front bezel 24 by temporary means such as velcro fasteners or double-sided adhesive tape.

A thin, light-weight, two-conductor transmitter signal wire 26 traverses the rear of the headband 12 and connects the transmitter module 10 to a computer interface module 28. The computer interface module 28 is a part analog and part digital circuit used for processing the data or information received by the three ultrasonic microphones 18, 20 and 22 and converting this information into data which shall be utilized to update the perspective view of the three-dimensional image. Three individual wires 30, 32 and 34 connect the three ultrasonic microphones 18, 20 and 22 to the appropriate connectors on the computer interface unit 28. A serial data bus cable 36 provides for the transmission of data between the computer interface unit 28 and the graphics computer 38 associated with the computer monitor display 16. The graphics computer 38 is connected to the display monitor 16 via a standard video cable 40.

Acoustic energy radiates from the transmitter module 10 in a more or less hemispherical energy field pattern in accordance with the principles of classical acoustical theory. The radiated energy from the transmitter module 10 impinges upon each of the three ultrasonic microphones 18, 20 and 22 as illustrated by straight line-of-sight rays 40a, b, and c. Acoustic energy travels approximately 1,100 feet per second, or about one foot in distance per millisecond of time. Because of the constant propagation velocity of sound, any real-time change in the position of the computer operator's head 14, and the transmitter module 10 associated therewith, causes a corresponding real-time change between the time of the initial transmitted signal and the time the signal is received by each of the three ultrasonic microphones 18, 20 and 22.

Through the use of state of the art digital circuitry, the elapsed time between the transmission and reception of the acoustic signal is processed and converted to corresponding bytes or words of data. Accordingly, since the elapsed time is known, as well as the velocity of the signal, which is a constant, then through basic physical principles the quantitative magnitude of the data is made to represent in direct proportion, the instantaneous distance between the ultrasonic transmitter module 10 and each of the three ultrasonic microphones 18, 20 and 22. The measured instantaneous distance between the ultrasonic transmitter module 10 and each of the three ultrasonic microphones 18, 20, and 22 is a good approximation of the instantaneous distance between the computer operator 14 and the image displayed on the computer monitor 16 because of the proximity of the transmitter module 10 to the computer operator's head and the proximity of the time ultrasonic microphones 18, 20, and 22 to the image displayed. These bytes or words of data are then transmitted in a predefined sequential fashion to the graphics computer 38 for processing by the existing three-dimensional graphics software resident in the computer 38.

A computer program is utilized to process the data from the three ultrasonic microphones 18, 20 and 22 to produce a software reconstruction of the instantaneous transmitter position relative to the three stationary ultrasonic microphones 18, 20 and 22 in three-dimensional space. The software generated information derived from this spatial reconstruction interacts with the X, Y, and Z rotational algorithms of the original graphics program to cause the three-dimensional image to change its perspective view, in direct one-to-one correspondence to the movement of the computer operator's head 14 in a manner exactly analogous to viewing three-dimensional objects in nature.

The program can also incorporate additional features which allow for variable rate of movement and/or rotation of the three-dimensional image relative to the head movement of the computer operator 14, other than the direct one-to-one correspondence described above. Pressing one or a combination of computer keyboard keys, for example, can cause only a slight positional change of the three-dimensional object for a large horizontal or vertical head movement. Alternatively, pressing a different combination of keys could cause a much more rapid positional change of the three-dimensional image with a relatively small head movement. This later feature would be particularly useful in situations where limited head movement is encountered, such as in aircraft cockpit for example.

In addition to responding to lateral and/or up-down head movements, the three-dimensional image can also be programmed to respond to in-out head movement. In this instance, the three-dimensional image changes in overall size in direct correspondence to the distance of the computer operator's head 14 from the computer display monitor 16, thus mimicking the same effect of viewing a three-dimensional scene in nature.

The use of three ultrasonic microphones is 18, 20 and 22 is necessary to achieve the desired three-dimensional perspective. Each ultrasonic microphone 18, 20 and 22 is utilized to determine the distance between the computer operator's head 14 along a specific axis, either the X, Y, or Z in three-dimensional space, from which the orientation of the computer operator's head 14 in relation to the computer display monitor 16 is calculated and the perspective view of the three-dimensional image rotated or shifted accordingly. In the case where a two-dimensional image is being viewed, three ultrasonic microphones 18, 20 and 22 are still necessary. The third microphone is necessary to resolve the three-dimensional movement of the computer operator's head into two-dimensional space. The principle utilized in the present invention is similar to triangulation techniques utilized to locate given objects.

Figure 2:
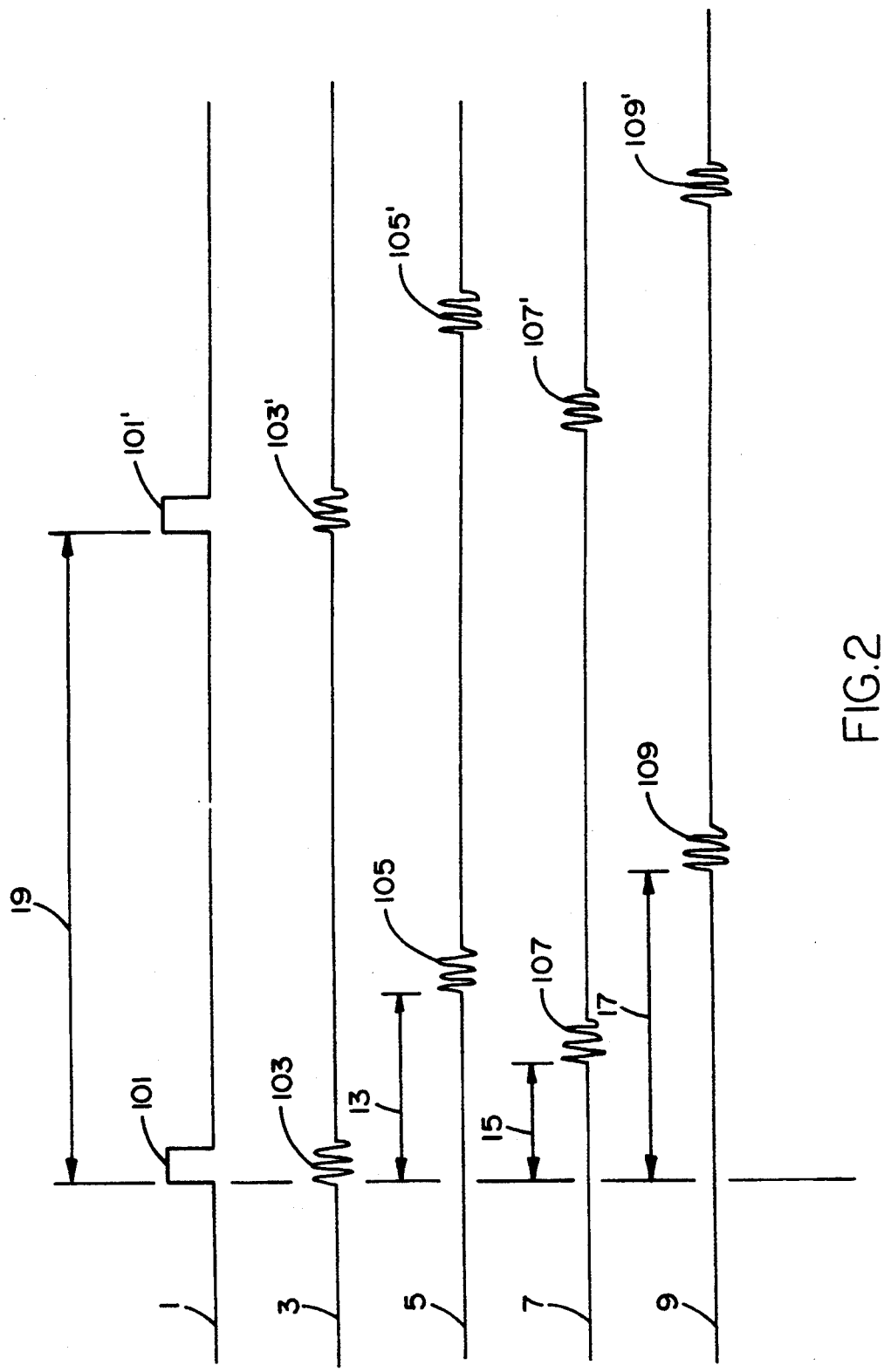
FIG. 2 is a timing signal diagram illustrating the relationships between signal transmission and signal reception for the display system of the present invention.

FIG. 2 illustrates the time relationships between the transmitted ultrasonic signal and the ultrasonic signal received by each of the three ultrasonic microphones 18, 20 and 22 as shown in FIG. 1. Trace 1 represents a trigger signal or pulse 101 which is internally generated by the computer interface unit 28 which is also shown in FIG. 1. The trigger pulse 101 is used to generate a precise ultrasonic sinusoidal frequency burst 103, as shown in trace 3, of the same duration as that of the trigger pulse 101. The burst 103 is generated by an ultrasonic audio oscillator amplifier which is part of the computer interface unit 28. This burst signal 103 is radiated by the transmitter module 10 worn by the computer operator 14 as shown in FIG. 1. The burst frequency is in the approximate range of between 30 to 60 kHz, depending upon the frequency/attenuation characteristics of the particular transmitter module 10 and the receiving microphones 18, 20 and 22 being utilized. Traces 5, 7 and 9 represent the time axes of the transmitted signal 103 received by the three separate ultrasonic microphones 18, 20 and 22 respectively. Datum line 11 provides a time references for traces 5, 7 and 9, relative to the leading edge of the transmitted burst 103. Upon initiation of the transmitter burst 103, ultrasonic microphone 18 receives burst 105 a finite time 13 after initiation of the transmitted ultrasonic burst 103. In a similar manner, this same burst 107 is received by ultrasonic microphone 20 at some finite time 15 after initiation of the transmitter burst 103, while ultrasonic burst 109 is received by ultrasonic microphone 22 at some finite time 17 after initiation of the transmitted ultrasonic burst 103. It is important to note that bursts 105, 107 and 109 are all time delayed versions of transmitter burst 103 and not separate and distinct signals. The time delay of each of these signals is utilized to calculate the relative position of the computer operator's head 14 in relation to the computer monitor 16. Because of the constantly changing head/transmitter module 10 movement relative to the three ultrasonic microphones 18, 20 and 22, time periods 13, 15 and 17 also change constantly in direct relation to this movement. The times 13, 15, and 17 are representative time lines illustrating one of an infinite number of reception patterns for the three ultrasonic microphones 18, 20, and 22. For example, in FIG. 2 it is shown that signal 107 is received by its corresponding ultrasonic microphone 20 before the other signals 105 and 109 are received by their corresponding ultrasonic microphones, microphones 18 and 22 respectively. However, depending upon the orientation of the computer operator's head 14, ultrasonic microphone 18 could have received its signal 105 before the other two ultrasonic microphones 20 and 22. FIG. 2 is for illustrative purposes only and should not be taken as representing exact time relationships between transmission and reception.

Updating the information generated by constantly changing computer operator head 14 movement relative to the three ultrasonic microphones 18, 20 and 22 is accomplished by repeating the entire sequence of events as described above at regular time intervals. Waveforms 101', 103', 105', 107' and 109' are directly analogous to waveforms 101, 103, 105, 107 and 109 respectively. These waveforms represent the repetition of the events described above, at time intervals 19 typically greater than 10 times the duration of the trigger waveform 101.

Figure 3:
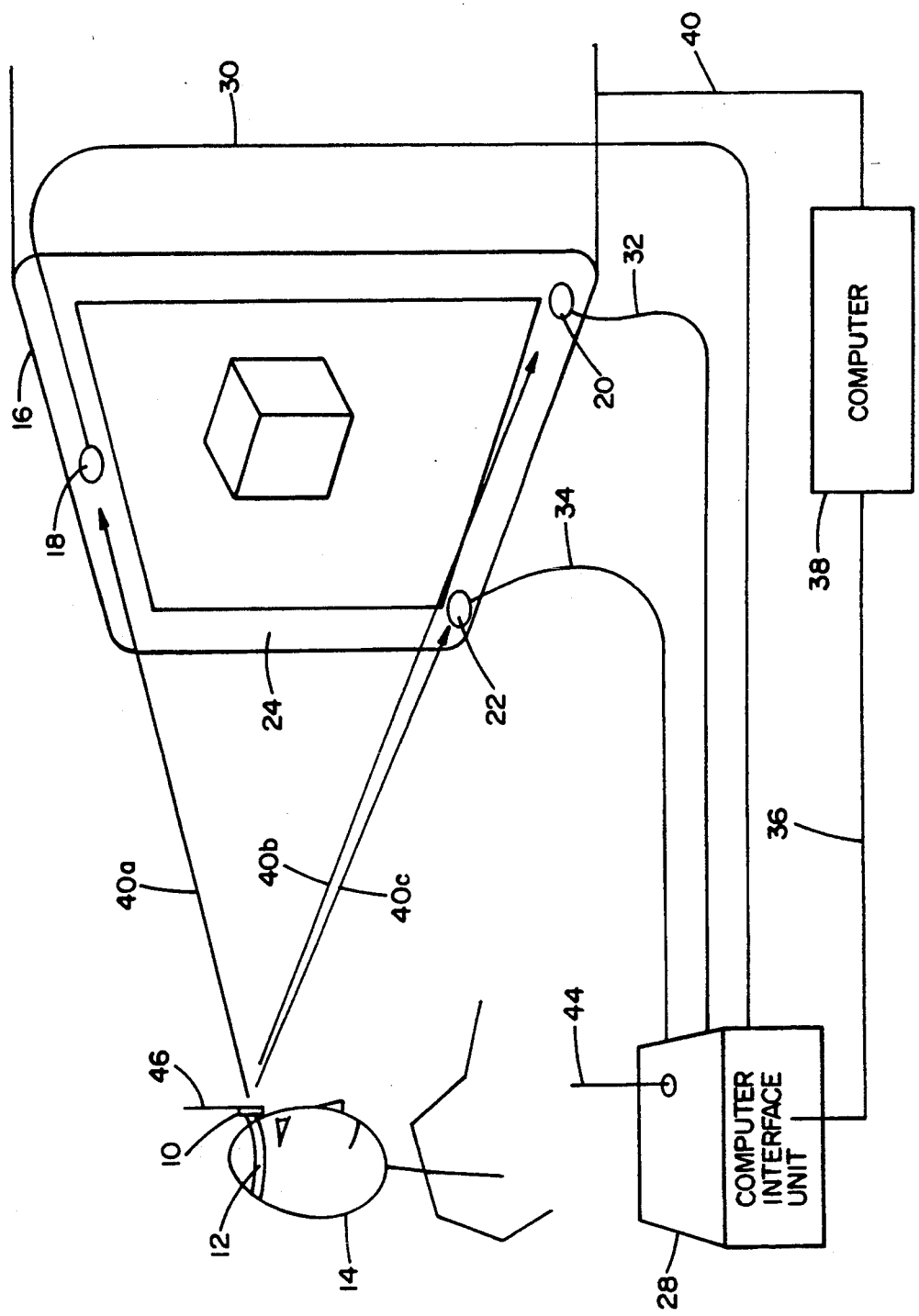
FIG. 3 is a schematic view of the three-dimensional computer image variable perspective display system of the present invention utilizing a wireless headset.

FIG. 3 illustrates an alternative embodiment for the practical implementation of the three-dimensional computer image variable perspective display system of the present invention. This embodiment provides for the operation of the ultrasonic transmitter module 10 without the need for the transmitter signal wire 26, as shown in FIG. 1, which connects the transmitter module 10 to the computer interface unit 28. In this embodiment, the transmitter module 10 is triggered by a very low power, short range VHF or UHF radio frequency transmitter generated within the computer interface unit 28. The signal from the radio frequency transmitter is transmitted via a short antenna 44. The transmitter module 10 also contains a miniature, battery operated radio frequency receiver whose input circuitry is also connected to a very short unobtrusive antenna 46.

Referring back to FIG. 2, the time relationships between the ultrasonic signals is the same as previously described; however, the trigger signal 101 which is internally generated by the computer interface unit 28 shown in FIG. 1 and used to generate the precise ultrasonic sinusoidal frequency burst 103 is now used instead to key the computer interface unit 28 radio frequency transmitter. When signal 101 is intercepted by the receiver in the ultrasonic transmitter module 10, the signal 101 gates an ultrasonic oscillator in the receiver which, through it's connection to the transmitter module 10, subsequently radiates the same ultrasonic pulses 103 and 103' as shown in trace 3. Once the ultrasonic pulse or signal 103 is transmitted, the three ultrasonic microphones 18, 20, and 22 will receive signals 105, 107 and 109 some finite time after transmission of pulse 103 as shown in the figure.

The use of a radio frequency link between the transmitter module 10 and the computer interface unit 28 completely eliminates the annoyance and encumbrance of a hard wired correction between these units 10 and 28, thus enhancing the convenience and use of this invention.

Figure 4:
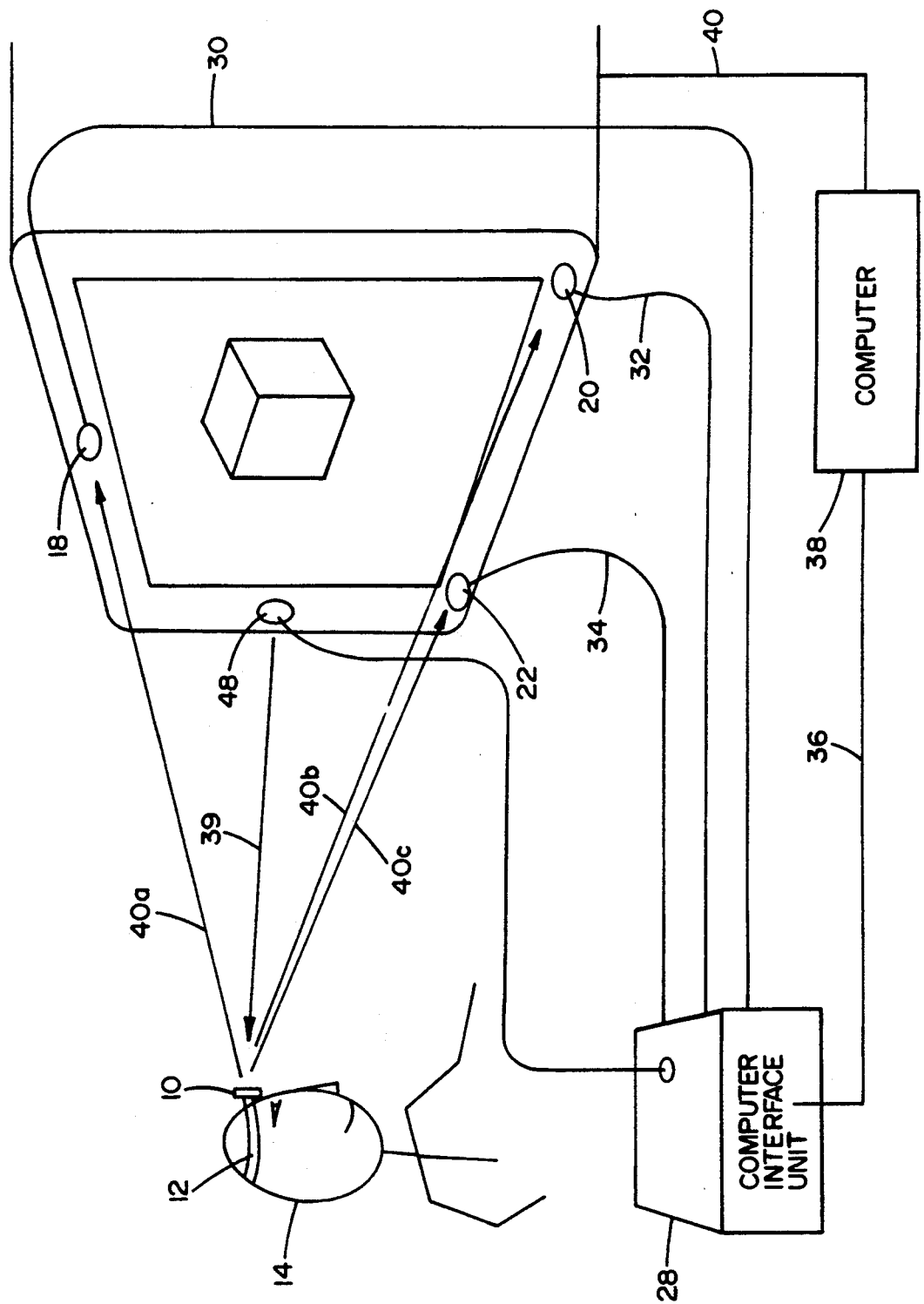
FIG. 4 is a schematic view of an alternative embodiment for the three-dimensional computer image variable perspective display system of the present invention utilizing a wireless headset.

FIG. 4 illustrates yet another alternative embodiment for the practical implementation of the three-dimensional computer image variable perspective display system of the present invention. This embodiment incorporates the use of an infrared light emitting diode and a photodiode detector combination, which also completely eliminates any wired connections between the headband ultrasonic transmitter module 10 and the computer interface unit 28. The light emitting diode/photodiode detector combination can be used as an alternative triggering method to that of the radio frequency transmitter described above if objections regarding spurious responses, radio frequency interference and the like are of concern when using the aforementioned triggering method. The light emitting diode/photodiode detector combination operates in a manner similar to the remote controlled operation of such devices as VCR'S and television sets in that the ultrasonic transmitter module 10 is triggered with a low energy burst of light.

In this embodiment, a small photodiode detector (not shown) is mounted alongside the transmitter module 10 with its axis of maximum light sensitivity pointed directly towards the computer monitor display 16. A light emitting diode 48 is mounted on the computer monitor's front bezel 24 with its axis of maximum radiation directed toward the computer operator 14. The light omitting diode 48 is connected to the computer interface unit 28 via a light emitting diode transmit signal wire 50. The ultrasonic transmitter module 10 circuitry is electronically integrated with the photodiode detector. Upon receiving a pulse of light 51 from the light emitting diode 48, the photodiode detector triggers the ultrasonic transmitter module 10, causing it to transmit the burst of ultrasonic energy which is received by the three microphones 18, 20 and 22.

Figure 5:
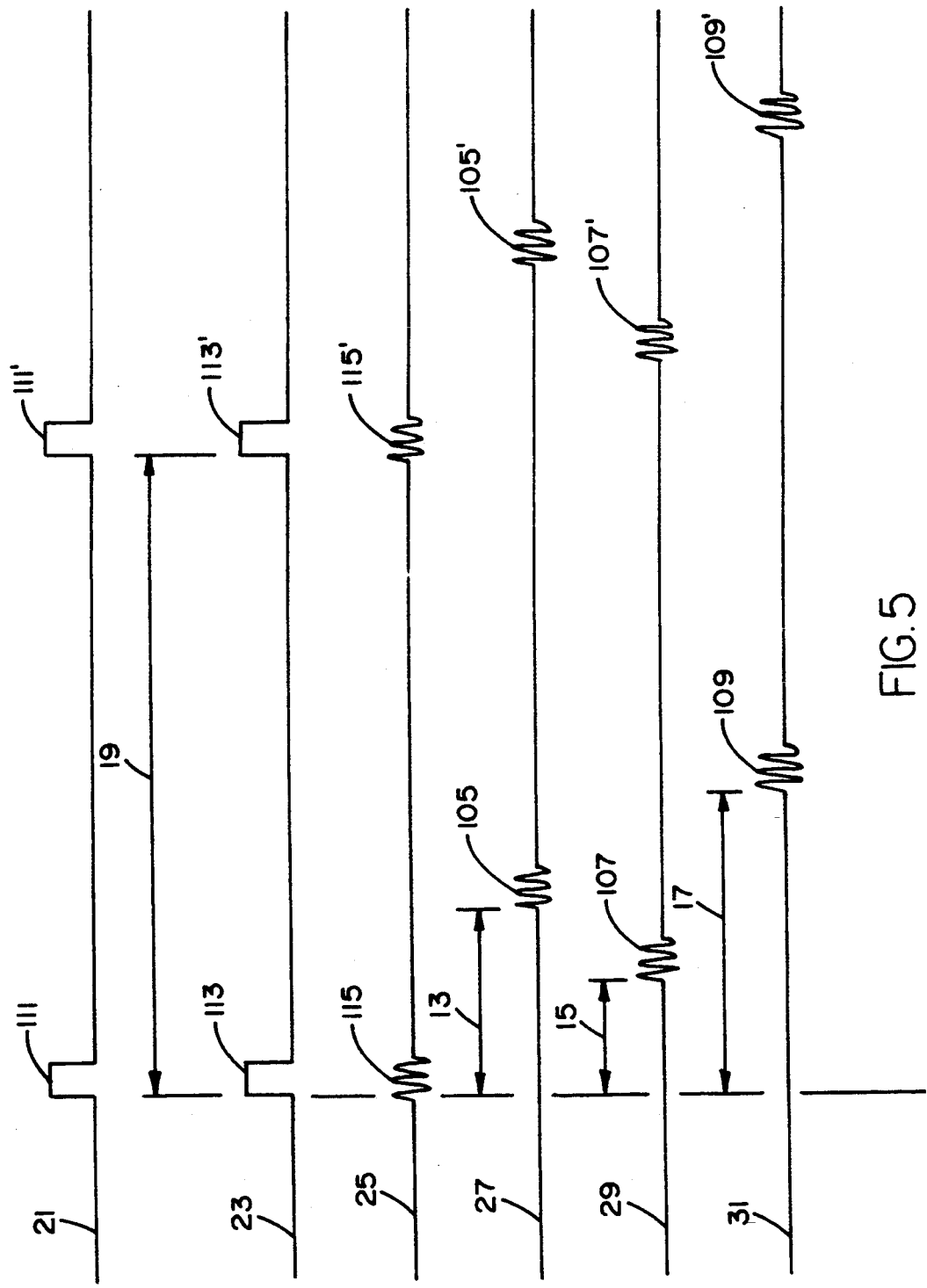
FIG. 5 is a timing signal diagram illustrating the relationships between signal transmission and signal reception for the alternate embodiment illustrated in FIG. 4.

FIG. 5 illustrates the time relationships between the ultrasonic signals utilizing this alternative embodiment. The light emitting diode 48 produces the light emitting diode drive signal 111 which is shown by trace 21. With the occurrence of the light emitting diode drive signal 111, the light emitting diode 48 produces a burst of light energy which lasts for the duration of the pulse 111. The burst of light energy, as received by the photodiode detector produces a corresponding signal 113, as shown in trace 23, of the same duration as the transmitted light emitting diode drive signal 111. This signal 113 subsequently causes the ultrasonic transmitter module 10 to produce a burst of ultrasonic energy 115 as shown in trace 25. The interactions and relationships of all subsequent signals and waveforms of FIG. 5 are the same as described in FIG. 2. Specifically, traces 27, 29, and 31 shown in FIG. 5 correspond to traces 5, 7, and 9 shown in FIG. 2 respectively.

Figure 6:
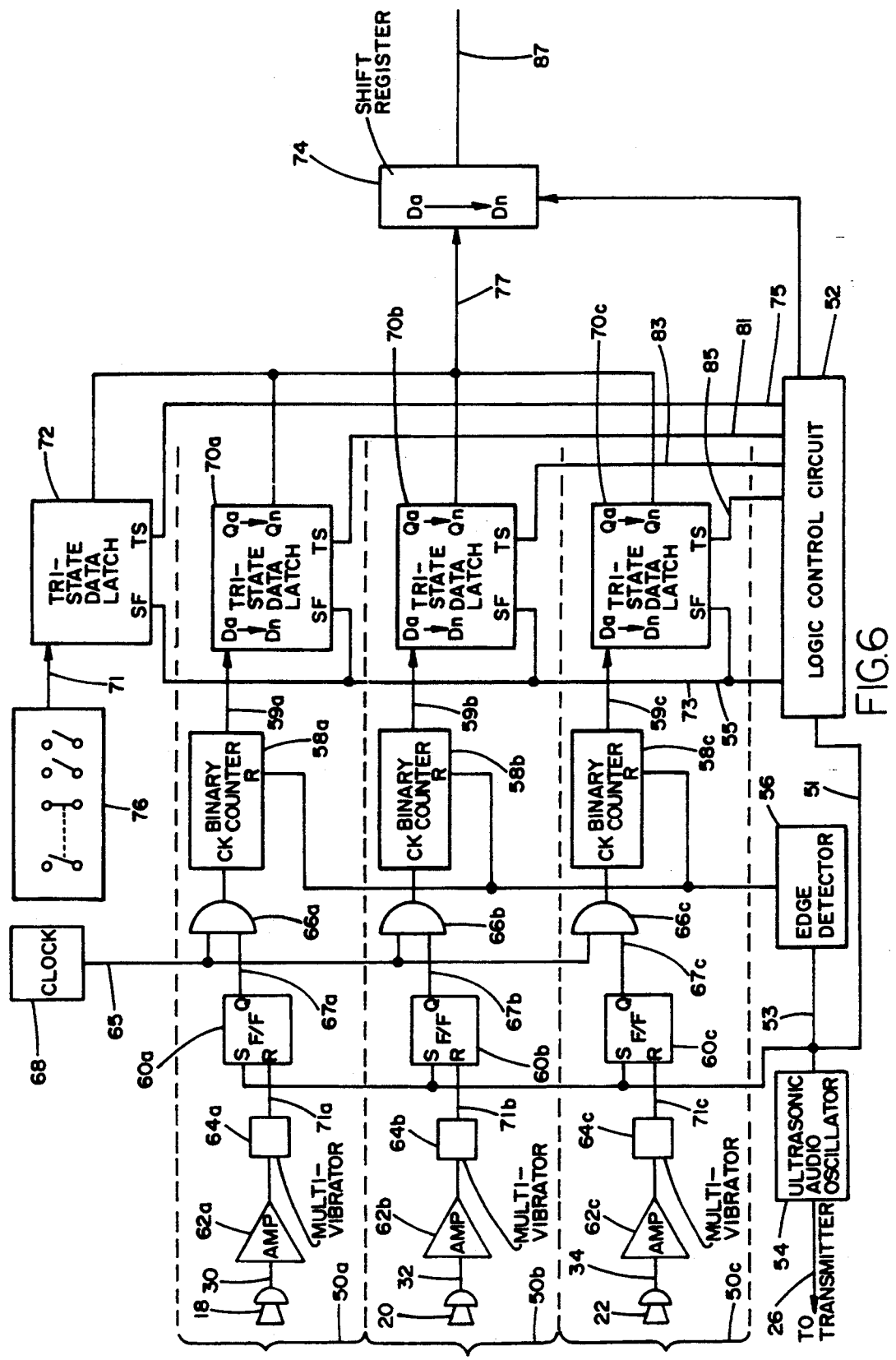
FIG. 6 is a block diagram of the computer interface unit of the present invention.

Although there are a variety of methods by which the above designs can be realized, FIG. 6, which is a block diagram of the computer interface unit 28, shows a detailed illustration of one approach to implementing the invention. Three channels, designated as 50a, 50b and 50c contain identical circuitry which processes and transforms the signals received by the three ultrasonic microphones 18, 20 and 22 into digital data words which are used to update the perspective view of the three-dimensional display. Since all three channels are identical, a detailed description of the operation of specific circuit elements for a single channel need only be given; however, there are certain components of the computer interface unit 28 that are not related to each specific channel independently, accordingly, the operation of these components will be discussed in relation to all three channels 50a, b and c.

In order to better understand the computer interface unit 28 and its operation, each component and its respective operation within the unit 28 is described as the overall process of adjusting the perspective view of a three-dimensional image is explained in detail. The logic control circuit 52 is responsible for generating all timing and control signals for controlling the operation of the three-dimensional computer image variable perspective display system. The first signal generated by the logic control circuit 52 is the transmit or trigger burst which is shown in FIG. 2 as trace 1. The trigger burst from the logic control circuit 52 is input to an ultrasonic audio oscillator/amplifier 54, via signal line 51, which as explained previously is connected to the headband mounted ultrasonic transmitter module 10, as shown in FIG. 1. The ultrasonic audio oscillator/amplifier 54 generates the ultrasonic sinusoidal frequency burst which is shown in FIG. 2 as trace 2. This ultrasonic sinusoidal frequency burst is radiated towards the computer display through the ultrasonic transmitter module 10. The trigger burst generated by the logic control circuit 52 is also input to an edge detector 56, via signed line 53, which in response to receiving the burst generates a positive going spike on the positive going edge of the trigger burst. This positive going spike resets each of three binary up-counters 58a, b, and c to zero counts. The positive going spike is input to the RESET input of each of the binary up-counters 58a, b, and c via signal line 55. The trigger burst generated by the logic control circuit 52 is also utilized as a means for setting each of three S-R flip-flops 60a, b, and c and accordingly forces the present state outputs of each of the three S-R flip-flops 60a, b, and c to logic 1 states. The significance of resetting the counters 58a, b, and c and setting the S-R flip-flops 60a, b, and c all in correspondence to generating the ultrasonic sinusoidal frequency burst is necessary for proper operation of the system.

At this point, the ultrasonic sinusoidal frequency burst has been transmitted or radiated towards the computer display, and accordingly, the three ultrasonic microphones 18, 20 and 22 each receive the ultrasonic sinusoidal frequency burst a finite time after transmission thereof and in correspondence to the position of the operator's head 14. The three ultrasonic microphones 18, 20 and 22 each connect to the input of one of three tuned analog amplifier/signal conditioners 62a, b, and c via signal lines 30, 32 and 34. The three tuned analog amplifier/signal conditioners 62a, b, and c comprise active operational amplifier filters which are tuned to the same frequency of operation as that of the transmitter module 10. The active filters are used to minimize or eliminate the response of the system to spurious low frequency ambient noise. The three tuned analog amplifier/signal conditioners 62a, b and c each also contain automatic gain control and threshold detection circuitry which transforms the sinusoidal frequency bursts received by the three ultrasonic microphones 18, 20 and 22 into noise free trigger pulses which are fed into the TRIGGER inputs of three monostable multivibrator circuits 64a, b, and c via signal lines 63a, b and c respectively. The monostable multivibrator circuits 64a, b, and c produce well defined rectangular pulses of fixed duration and which are suitable for processing by digital circuitry based upon receipt of the transmitted signal by the three ultrasonic microphones 18, 20 and 22. It is important to recall that depending upon the position of the computer operator's head, the transmitted signal will not typically be received by the three ultrasonic microphones 18, 20, and 22 simultaneously. However, for purposes of this description, it will be assumed that the transmitted signal is received simultaneously by each of the three ultrasonic microphones 18, 20, and 22.

A counter clock 68 provides a clock output signal to one input of three, two-input AND gates 66a, b and c via signal line 65. The counter clock 68 is a fixed frequency astable multivibrator which produces a continuous clock frequency signal which is gated to the binary up-counters 58a, b, and c through the three AND gates 66a, b, and c. The second input to each of the three AND gates 66a, b, and c is the present state outputs of each of the three S-R flip-flops 60a, b, and c carried by lines 67a, b and c respectively. Since the counter clock 68 produces a continuous signal, one input to each of the three AND gates 66a, b, and c is always high, or at a logic 1 state. Recalling that the trigger burst generated by the logic control circuit 52 sets the three S-R flip-flops 60a, b, and c, both inputs to the three AND gates 66a, b, and c are high or at a logic 1 level; accordingly, the outputs of each of the three AND gates 66a, b, and c are high or at logic 1 levels.

The output lines of the three AND gates 66a, b, and c are connected to the CLOCK inputs of the three binary up-counters 58a, b, and c via signal lines 69a, b and c. The logic 1 levels of the three AND gates 66a, b, and c causes the three binary up-counters 58a, b, and c to initiate counting. The binary up-counters 58a, b, and c continue to count as long as the outputs of each of the three AND gates 66a, b, and c remain at a logic 1 level. The three binary up-counters 58a, b and c contain CLOCK and RESET inputs as explained above, and a number of parallel outputs, equal in number to the series-connected interval counter stages Qa through Qm, contained in each binary-up counter. As long as the three AND gates 66a, b, and c output logic 1's to the CLOCK inputs, the counter stages change state in cascade fashion. When the CLOCK input changes to a logic O level, the counter stages produce a static unchanging binary count whose binary magnitude is equal to the cumulative number of clock pulses from counter clock 68. The binary count on each of the binary up-counters 58a, b, and c represents the relative distances between the computer operator's head and the three ultrasonic microphones 18, 20 and 22 as was previously explained and will be further discussed subsequently.

In the present invention, resolution refers to the smallest change in distance between the ultrasonic transmitter 10 and the three ultrasonic microphones 18, 20, and 22 which results in a finite, discernable movement of the three-dimensional display on the computer monitor 16. The number of stages contained in the three binary up-counters 58a, b and c directly affects the distance resolution of this system. An eight-stage binary counter, for example, can provide a resolution of 1 part in 256, while a sixteen-stage binary counter will provide a resolution of 1 part in 64k. Mathematically, the distance resolution is given by $$\text{distance resolution} = 2^n, \quad (1)$$

where n is the number of binary counter stages.

A signal received by one of the three ultrasonic microphones 18, 20 and 22 causes its associated particular binary up-counter 58a, b, or c to cease counting. As stated previously, when the three ultrasonic microphones 18, 20 and 22 receive the transmitted signal, the signal is processed in each channel by one of three tuned analog amplifier/signal conditioners 62a, b, and c, and wherein the three monostable multivibrator circuits 64a, b, and c produce well defined rectangular pulses suitable for processing by digital circuitry. These rectangular pulses are each input into the RESET input of the three flip-flops 60a, b, and c via signal lines 71a, b, and c. The pulse on the reset input causes the present state outputs of the three S-R flip-flops 60a, b, and c to change from a logic 1 state to a logic O state. Recalling that the present state outputs of the three S-R flip-flops 60a, b, and c are connected to one input of each of the three two-input AND gates 66a, b, and c, a present state output of logic O causes the outputs of the AND gates 66a, b, and c to also change to a logic O state, thereby causing the three binary up-counters 58a, b, and c to cease counting. Once the binary up-counters 58a, b, and c cease counting, they each contain a finite count which is representative of the actual distance between the ultrasonic transmitter module 10 and the three ultrasonic microphones 18, 20 and 22.

At some finite time after all three binary up-counters 58a, b and c assume a static state, i.e. no longer counting, the logic control circuit 52 generates a logic 1 pulse which is input to the STORE-FOLLOW inputs of four tri-state data latches 70a, b, c and 72 via signal line 73. This logic 1 pulse causes the output of the three data latches 70a, b, and c associated with the three binary up-counters 58a, b and c to be updated to the binary count currently stored within its associated binary up-counter 58a, b or c, and the fourth data latch 72 to be updated to a binary word from a preset array of dip switches 76. The binary up-counters 58a, b and c are connected to the tri-state data latches 70a, b, and c via signal lines 59a, b and c respectively, and dip switch array 76 is connected to tri-state data latch 72 via signal line 71. Prior to the logic 1 pulse, the outputs of all four data latches 70a, b, c and 72 are configured as open circuits with infinite inpedence, therefore, no data appears at the inputs, Da through Dn, of the parallel-to-serial shift register 74 from the output of any of the four data latches 70a, b, c and 72. On the trailing edge of the logic 1 pulse to the store-follow inputs, however, the logic control circuit 52 generates another logic 1 pulse which is input into the tri-state input of data latch 72 via signal line 75 and momentarily configures the outputs of the data latch 72 to the low inpedence state causing the data at the latch output to appear at the input of the shift register 74 via signal line 77. During this time, a logic signal from the logic control circuit 52 and carried on line 79 sets the shift register 74 in the parallel-load mode, causing the shift register counter stages to now assume the binary data word of the output of the data latch 72. Upon the logic 1-0 transition of the tri-state input pulse to data latch 72, the shift register 74 is now configured in the serial transmit mode, causing the shift register 74 to transmit in serial form, the data fed to it from the output of the data latch 72, to a processing means for further processing via serial bus 87.

In a manner identical to the above description, the three remaining tri-state data latches 70a, b, and c also individually transmit their output data in a sequential manner to the shift register 74 for eventual serial transmission. The first word shifted out of the shift register 74 is the fixed binary word derived from the predetermined setting of the dip switch array 76, while the three remaining words shifted out of the shift register 74 represent the data ultimately derived from the three ultrasonic microphones 18, 20 and 23. Accordingly, tri-state data latch 70a shifts the binary count from binary up-counter 58a into shift register 74 upon a tri-state pulse from the logic control circuit 52 via signal line 81, tri-state data latch 70b shifts the binary count from binary up-counter 58b into shift register 74 upon a tri-state pulse from the logic control circuit 52 via signal line 83, and tri-state data latch 70c shifts the binary count from binary up-counter 58c with shift register 74 upon a tri-state pulse from the logic control circuit 52 via signal line 85. The timing of there signals is shown and discussed in regard to FIG. 7.

In order to ensure proper sequential interaction of this data with the computer software which ultimately controls the three-dimensional image, the dip switch array 76 outputs a binary word for identifying the sequence of data derived from each of the ultrasonic microphones 18, 20, and 22. The dip switch array 76 contains a group of switches which are set to an a fixed, predetermined constant byte pattern, designated as the start byte, which precedes the subsequent bytes generated by each of the three ultrasonic microphones 18, 20 and 22.

FIG. 7 shows a timing diagram for all input/output signals of the computer interface unit 28 of FIG. 6. The logic levels and stages shown describe the functions of the various elements shown in tile block diagram of the computer interface unit 28 shown in FIG. 6. The logic indications may vary however, as dictated by the requirements of the actual integrated circuits used to realize this invention.

Trace 201 in FIG. 7 shows the transmit pulse 202 as generated by the logic control circuit 52. As previously described, this pulse 202 generates an ultrasonic sinusoidal frequency burst which is subsequently fed to the transmitter module 10 shown in FIG. 1 and to monostable multivibrator 56 also shown in FIG. 6. The monostable multivibrator 56 generates a positive-going spike 204, shown in trace 203, on the positive-going edge of the transmit pulse 202 which resets all binary up-counters 58a, b and c. This same transmit pulse 202 also sets all three S-R flip-flops 60a, b and c to pass the free-running counter clock signal 206 directly to the CLOCK inputs of binary up-counters 58a, b and c, causing these counters to start counting up. All these binary up-counters 58a, b and c continue to count simultaneously, until such time as a signal, received by a specific microphone 18, 20 or 22, causes a specific binary up-counter to stop counting. Trace 207, for example, shows an output pulse 208a from monostable multivibrator 64a, generated some finite time after tile initial transmit pulse 202. This pulse 208a resets S-R flip-flop 60a via the RESET input, which forces the present state output to a logic 0 state. Since, in a traditional AND logic gate, both inputs must be simultaneously at a logic 1 state to produce a logic 1 output state, the logic 0 state at the present state output of the flip-flop 60a forces the output of AND gate 66a to a logic 0 state, blocking the transmission of the counter clock signal 206, shown in trace 205 to the binary up-counter 58a clock input, thus causing the counter 58a to stop counting. Time domain 210, shown in trace 209 shows the time period during which the binary up-counter 58a is actively counting up, before the occurrence of the monostable multivibrator 64a output pulse 208a. Upon the event of the monostable pulse 208a and the subsequent interruption of clock pulses to the binary up-counter 58a via AND gate 66a, time domain 212, also shown in trace 209, shows the output of the counter 58a after it has stopped counting. Thus, time domain 210 shows the changing data state of the counter 58a, while time domain 212 shows the static data state of the counter.

Since three identical channels are used to process the information from each ultrasonic microphone 18, 20 or 22, many of the timing diagram traces of FIG. 7 are analogous to each other. Traces 207, 211 and 215 of FIG. 7 for example, represent the outputs of 208a, b and c monostable multivibrators 64a, b and c of FIG. 6 respectively. Traces 209, 213, and 217 of FIG. 7 represent the outputs of binary up-counters 58a, b and c of FIG. 6 respectively. Because of this analogy, the timing diagram explanation given in the previous paragraph for channel 50a is also valid for channels 50b and 50c.

At some time after all three binary up-counters 58a, b, and c assume the static data state as shown in traces 209, 213 and 217 by time domains 212, 214, and 216, a logic 1 pulse 218, shown in trace 219, generated by the logic control circuit 52, appears at the store-follow inputs of all four tri-state data latches 70a, b, c and 72. This causes the outputs of the data latches 70a, b, c and 72 to be updated to the binary count of each binary up-counter 58a, b, and c to which they are individually connected. Traces 221, 223, 225, and 227 show the logic states of the tri-state inputs 220, 224, 226 and 228 of latch 72, 70a, 70b, and 70c respectively. Prior to the appearance of pulse 218, traces 221, 223, 225 and 227 of FIG. 7 all show a logic 0 state which configures the outputs of all four tri-state data latches 70a, b, c and 72 in the infinite impedance, open circuit condition. Thus, no data appears at the inputs Da thru Dn of the parallel-serial shift register 74 from the output of any data latch 70a, b, c or 72. Immediately after the occurrence of pulse 218 however, the tri-state input of data latch 72, receives a logic 1 pulse 220 as shown in trace 221. This pulse momentarily configures the outputs of data latch 72 to the low impedance state, causing the data at the latch to appear at the input of the shift register 74. During this time, a logic signal from the logic control circuit 52 sets the shift register 74 in the parallel-load mode, causing the shift register counter stages to now assume the binary count of the output of latch 72. Upon the logic 1-to-0 transition of pulse 220, the shift register 74 is now configured in the serial transmit mode, causing the shift register 74 to transmit in serial form the data fed to it from the output of data latch 72 which is indicated by the time domain 222 of trace 229.

In a manner identical to the above description, tristate latches 70a through 70c also individually transmit their output data in a sequential manner, to the shift register 74 for eventual serial transmission. First, a data latch is set to the low-impedance state, causing it's output data to appear at the data inputs of the shift register 74. The shift register 74 then shifts the data out in serial form onto the serial data line. Thus, tri-state pulses 224, 226, and 228 subsequently give rise to the serial data streams represented in time domains 230, 232, and 234 respectively. The first time domain 222 indicates the fixed binary word, derived from the predetermined setting of the dip switch array 76, while the remaining three time domains 230, 232 and 234 represent the data ultimately derived from ultrasonic microphones 18, 20, and 22 respectively.

Updating the information generated by constantly changing head movement relative to the three microphones is accomplished by repeating the entire sequence of events as described above at regular time intervals. Thus, all the events bracketed in time period 231 are repeated in time period 233. Trigger pulse 208', for example, is analogous to pulse 208, while time domains 210' and 212' are analogous to the time domains 210 and 212 respectively.

A computer program is utilized to process the digital information derived from each of the three ultrasonic microphones so as to provide a software reconstruction of the instantaneous transmitter position relative to the three stationary ultrasonic microphones in three-dimensional space. This interfacing software is loaded into or is otherwise resident in the graphics computer. In this type of configuration, the output of the computer interface unit is plugged into the graphics computer RS-232 Bus, where the computer eventually receives the microphone derived information shifted out by the shift register 74, via the interfacing software to ultimately control the three-dimensional image.

The software can typically be divided into two main functional units. The first unit is responsible for converting binary words representing elapsed times into linear distance measurements. This procedure is a relatively simple procedure utilizing the relationship given by $$d = v*t, \qquad (2)$$

where, d is distance, v is velocity and t is time. Since the velocity of sound is a constant and the time has been measured, distance can be easily calculated. The software then resolves the distances calculated from the measurements by the three microphones into three-dimensional space utilizing various matrix algebra techniques. The second unit of software then takes the resolved distances and formats them in a form suitable for interaction with the rotational algorithms of the graphics software. In utilizing this method, it is necessary to understand the source code utilized to generate the graphics image, and effectively integrate the three-dimensional positions into the graphics software.

In an alternative embodiment, in addition to the circuitry required to process the signals from each ultrasonic microphone 18, 20 or 22 into a train of bytes, the computer interface unit 28 also contains a small, self-contained mini-computer or microprocessor. Instead of connecting to the graphics computer via the RS-232 Bus, the output of the interface unit plugs directly into either the existing graphics computer mouse or joystick (game port) inputs, thus replacing the mouse or joystick device altogether, the very same mouse or joystick which was originally used to control the perspective manipulation of the three-dimensional image, prior to the deployment of this invention. The small, self-contained mini-computer contains all the necessary circuitry and resident software needed to process the microphone-generated byte stream internally, similar to the first unit of software described above, and converts this information directly into contact closure and/or pulse train signals which exactly imitate the same kind of signals normally generated by a mouse or joystick device. Making the computer interface unit an intelligent, self-contained, stand-alone unit, completely eliminates the need for ancillary software with all the attendant software interface engineering problems of interfacing with prewritten, three-dimensional graphics software.

While the invention has been particularly shown and described with respect to the preferred embodiments thereof, it should be understood by those skilled in the art that the foregoing and other changes in form and details may be made therein without departing from the spirit and scope of the invention which should be limited only by the scope of the appended claims.

What is claimed is:

1. Apparatus for controlling the perspective view of computer generated graphical images in proportion to the head movements of a computer operator viewing the images on a computer monitor, comprising:
   only a single transmitter, mounted relative to the computer operator's head for movement therewith for transmitting ultrasonic signals of a given frequency and at predetermined intervals;
   a plurality of individual ultrasonic receivers, mounted relative to said computer monitor and being arranged in a geometrical pattern surrounding said computer monitor, for receiving the ultrasonic signals from said transmitting means; and
   measuring means, connected to each of said plurality of individual ultrasonic receivers, for converting said signals received by each of said plurality of individual ultrasonic receivers into a plurality of data signals representative of the instantaneous distance between the computer operator's head and said computer monitor.

2. The apparatus of claim 1, further comprising processing means, receiving said plurality of data signals, for altering the perspective view of said graphical image displayed on said computer monitor based upon the instantaneous distance between the computer operator and said computer monitor.

3. The apparatus of claim 2, wherein said transmitting means comprises a miniaturized audio frequency ultrasonic transmitter module mounted on a headband worn by the computer operator and positioned to direct radiated ultrasonic acoustic energy directly towards said computer monitor.

4. The apparatus of claim 2, wherein said plurality of individual ultrasonic receivers comprise three audio frequency ultrasonic microphones arranged in a triangular configuration surrounding said computer monitor.

5. The apparatus of claim 4, wherein said measuring means comprises three channels, one for each of said three audio frequency ultrasonic microphones, wherein each of said three channels comprises identical hardware comprising an analog section and a digital section, said analog section including signal conditioning means and means for converting an analog signal from its associated ultrasonic microphone into a pulse suitable for digital processing, and said digital section including means for converting said pulse into a binary word representative of the instantaneous distance along one axis in a three-dimensional coordinate system between the computer operator's head and said computer monitor, each of said three channels corresponding to a different axis in the three-dimensional coordinate system.

6. The apparatus of claim 5, wherein said measuring means further comprises an ultrasonic audio oscillator/amplifier for generating said ultrasonic signals of a given frequency and at predetermined intervals for transmission by said transmitting means.

7. The apparatus of claim 6, wherein said measuring means further comprises a control means for controlling the operation of said measuring means and ensuring a correct sequential transfer of said binary words to said processing means.

8. The apparatus of claim 7, wherein said processing means receives said binary words and reconstructs the instantaneous position of the computer operator's head relative to said computer monitor in three-dimensional space, said processing means having means for converting said instantaneous position into signals which interact with the X, Y, and Z rotational axis algorithms of the graphics software resident in the computer to alter the perspective view of said graphical image.

9. Apparatus for controlling the perspective view of computer generated, three-dimensional graphic images in direct proportion to the head movements of a computer operator viewing the images on a computer monitor, comprising:
   only a single transmitter, mounted relative to the computer operator's head for movement therewith, for transmitting bursts of ultrasonic audio signals of a given frequency and at predetermined intervals;
   three individual ultrasonic receivers, mounted relative to said computer monitor and being arranged in a triangular configuration surrounding said computer monitor, for receiving the ultrasonic audio signals from said transmitting means;
   measuring means, connected to said three individual ultrasonic receivers, for measuring the elapsed times between the transmission of the bursts of ultrasonic audio signals and the receipt of the bursts of ultrasonic audio signals by each of said three individual ultrasonic receivers, wherein the elapsed times are dependent upon the orientation of the computer operator's head relative to said computer monitor and represent in direct proportion, the instantaneous distance between the computer operator's head and said computer monitor, said measuring means having means for generating three data signals corresponding to said instantaneous distance in a three-dimensional coordinate system; and
   processing means, interfaced with said measuring means for receiving said three data signals, for updating the perspective view of said computer generated, three-dimensional graphic images in direct correspondence to the movement of the computer operator's head based upon the three data signals.

10. The apparatus of claim 9, wherein said transmitting means comprises a miniaturized audio frequency ultrasonic transmitter module mounted on a headband worn by said computer operator, and positioned to direct its radiated ultrasonic acoustic energy directly towards said computer monitor.

11. The apparatus of claim 10, wherein said ultrasonic transmitter module is connected to said measuring means by a two-conductor transmitter signal wire which carries said ultrasonic audio signals for transmission to said ultrasonic transmitter module.

12. The apparatus of claim 10, wherein said ultrasonic transmitter module further includes a miniature, battery operated radio frequency receiver for receiving radio frequency triggering signals which cause said ultrasonic transmitter module to transmit ultrasonic audio signals.

13. The apparatus of claim 10, wherein said ultrasonic transmitter module further includes an infrared receiver for receiving infrared triggering signals which cause said ultrasonic transmitter module to transmit ultrasonic audio signals.

14. The apparatus of claim 9, wherein said three individual ultrasonic receivers comprise three audio frequency ultrasonic microphones having their sensitive receiving axis directed towards-the computer operator's head.

15. The apparatus of claim 14, wherein said three audio frequency ultrasonic microphones are mounted on a front bezel of said computer monitor.

16. The apparatus of claim 9, wherein said three audio frequency ultrasonic microphones are mounted on a frame which surrounds said computer monitor.

17. The apparatus of claim 9, wherein the computer includes a graphics computer mouse input or a joystick game port input, and the apparatus comprises a computer interface unit which includes said measuring means, and said measuring means comprises three channels, one for each of said three audio frequency ultrasonic microphones, wherein each channel converts an analog signal from its associated ultrasonic microphone into a train of bytes for digital processing, and the computer interface unit further includes a processor which is connected directly to the graphics computer mouse input or the joystick game port input, thus replacing the mouse or joystick device, and the processor processes the trains of bytes internally and converts the information in the trains of bytes directly into contact closure and/or pulse train signals which exactly imitate the kind of signals generated by a mouse or joystick device, such that the computer interface unit is an intelligent unit which eliminates the need for ancillary software.

18. The apparatus of claim 14, wherein said measuring means comprises three channels, one for each of said three audio frequency ultrasonic microphones, wherein each of said three channels comprises identical hardware comprising of an analog section and a digital section, said analog section including a signal conditioning means, and means for converting an analog signal from its associated ultrasonic microphone into a pulse suitable for digital processing, and said digital section including means for converting said pulse into one of said three data signals which is a binary word representative of the instantaneous distance along one axis in a three-dimensional coordinate system between the computer operator's head and said computer monitor, each of said three channels corresponding to a different axis in the three-dimensional coordinate system.

19. The apparatus of claim 18, wherein said measuring means further comprises an ultrasonic audio oscillator/amplifier for generating said ultrasonic audio signals of a given frequency and at predetermined intervals for transmission by said transmitting means.

20. The apparatus of claim 19, wherein said measuring means further comprises a control means for controlling the operation of said measuring means and ensuring the correct sequential transfer of said binary words to said processing means.

21. The apparatus of claim 18, wherein said signal conditioning means comprises:
- active operational amplifier filters tuned to the ultrasonic frequency transmitted by said transmitter means, for minimizing the effect of spurious low frequency ambient noise by filtering said analog signal from one of said three ultrasonic microphones; and
- automatic gain control/threshold detection circuitry for transforming the analog signal output from said filters into noise free trigger pulses.

22. The apparatus of claim 21, wherein said means for converting an analog signal comprises a monostable multivibrator for receiving said noise free trigger pulse and outputting a rectangular pulse of fixed duration for processing by said digital section.

23. The apparatus of claim 22, wherein said means for converting an analog signal comprises:
- gating means, responsive to said rectangular pulse, comprising an S-R flip-flop and a two input logic AND gate, the present state output of said S-R flip-flop is input to one input of said two input logic AND gate while the second input is a continuous clock signal, said gating means outputting a logic 1 level signal until receipt of said rectangular pulse upon which said gating means outputs a logic 0 level signal;
- binary counting means, responsive to said gating means, being initialized by a control signal from said control means and continuing counting until said gating means outputs a logic 0 level signal, and upon receipt of a logic 0 level signal, said binary counting means temporarily storing the binary count as a final binary count; and
- data latch means for storing the final binary count contained in said binary counting means upon a STORE-FOLLOW pulse from said control means and for serially shifting said binary count into a shift register for storage of said final binary count.

24. The apparatus of claim 23, wherein said processing means receives the binary words and reconstructs the instantaneous position of the computer operator's head relative to said computer monitor in a three-dimensional coordinate system, said processing means having means for converting said instantaneous position into signals which interact with X, Y, and Z rotational axis algorithms of the graphics software resident in the computer to alter the perspective view of said graphical image.

25. The apparatus of claim 24, wherein said processing means comprises a preprogrammed microprocessor for converting said final binary count from each of said three channels, which are time based signals, into X, Y and Z distance signals utilizing an algorithm which multiplies the known velocity of sound by the final binary count, said microprocessor having an input/output port for connecting said processing means to said graphics computer.

26. A method for controlling the perspective view of computer generated graphical images in proportion to the head movement of a computer operator viewing the image on a computer monitor, said method comprising the steps of:
- (a) transmitting ultrasonic signals of a given frequency and at predetermined intervals from only a single transmitter at a position in close proximity to said computer operator's head towards said computer monitor;
- (b) measuring the elapsed times between the transmission of said ultrasonic signals and the receipt of said ultrasonic signals by a plurality of ultrasonic receivers mounted in close proximity to said computer monitor;
- (c) converting the received signals into a plurality of data words representative of the instantaneous distance between said computer operator's head and said computer monitor; and
- (d) processing said data words and altering the perspective view of said graphical image displayed on said computer monitor based upon the instantaneous distance between the computer operator and said computer monitor.

27. The method of claim 26, wherein said step of transmitting ultrasonic signals comprises radiating ultrasonic acoustic energy directly towards said computer monitor.

28. The method of claim 27, wherein said step of measuring the elapsed times comprises detecting said transmitted signal, filtering out background noise, and converting the received signals into pulses for digital processing.

29. The method according to claim 28, wherein said step of converting comprises generating a binary count representative of the elapsed times in response to said pulses and shifting said binary count into a processing means for conversion of said binary counts into signals which interact with the X, Y, and Z rotational axis algorithms of graphics software resident in the computer to alter the perspective view of said graphical image.

30. The method of claim 26, wherein said step of processing comprises converting time based measurements into three-dimensional distances for interaction with the X, Y and Z rotational algorithms.

* * * * *